(12) United States Patent
Constable et al.

(10) Patent No.: US 11,151,770 B2
(45) Date of Patent: Oct. 19, 2021

(54) RENDERING IMAGES USING DECLARATIVE GRAPHICS SERVER

(71) Applicant: Facebook Technologies, LLC, Menlo Park, CA (US)

(72) Inventors: Benjamin Charles Constable, Sammamish, WA (US); David Teitlebaum, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/578,943

(22) Filed: Sep. 23, 2019

(65) Prior Publication Data
US 2021/0090321 A1 Mar. 25, 2021

(51) Int. Cl.
| | |
|---|---|
| *G06T 15/08* | (2011.01) |
| *G02B 27/00* | (2006.01) |
| *G02B 27/01* | (2006.01) |
| *G06T 1/60* | (2006.01) |
| *G06T 15/20* | (2011.01) |
| *G06T 19/00* | (2011.01) |

(52) U.S. Cl.
CPC .......... *G06T 15/08* (2013.01); *G02B 27/0093* (2013.01); *G02B 27/017* (2013.01); *G06T 1/60* (2013.01); *G06T 15/20* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 7,065,742 B1* | 6/2006 | Bogdan | G06F 9/4492 717/106 |
| 9,317,175 B1 | 4/2016 | Lockhart | |
| 2002/0089508 A1 | 7/2002 | Sowizral | |
| 2007/0222783 A1* | 9/2007 | Seemann | G06F 9/451 345/441 |
| 2008/0276252 A1* | 11/2008 | Pronovost | G06F 9/54 719/318 |
| 2014/0053063 A1* | 2/2014 | Cirrincione | G06F 16/957 715/235 |
| 2014/0055348 A1 | 2/2014 | Sudo | |
| 2016/0343164 A1 | 11/2016 | Urbach | |

(Continued)

OTHER PUBLICATIONS

Unreal Engine, Rendering Overview, 6 pages, available at https://docs.unrealengine.com/en-US/Engine/Rendering/Overview/index.html.

(Continued)

*Primary Examiner* — Jason A Pringle-Parker
(74) *Attorney, Agent, or Firm* — Baker Botts L.L.P.

(57) ABSTRACT

In one embodiment, a method for rendering objects within an operating system includes receiving multiple data structures from applications executing on the operating system. Each data structure includes a declarative definition of one or more objects within a volumetric space to be displayed to a user of the operating system. The operating system can generate a render graph that includes the declarative definition of each data structure and can cause images of the objects associated with each data structure to be rendered based on the render graph and a pose of the user relative to the volumetric space.

17 Claims, 6 Drawing Sheets

(56) References Cited

U.S. PATENT DOCUMENTS

2019/0197785 A1\* 6/2019 Tate-Gans ............. G06T 19/006
2020/0320794 A1\* 10/2020 Huang .................... G06T 19/20

OTHER PUBLICATIONS

Schechter, How Underlying WPF concepts and technology are being used in the DWM, pp. 1-7, available at http://web.archive.org/web/20160312220130/https:/blogs.msdn.microsoft.com/greg_schechter/2006/06/09/how-underlying-wpf-concepts-and-technology-are-being-used-in-the-dwm/, Jun. 9, 2006.

HTML&CSS, 2 pages, available at https://www.w3.org/standards/webdesign/htmlcss, 2016.

Graphics and Multimedia, Microsoft, pp. 1-8, available at https://docs.microsoft.com/en-us/dotnet/framework/wpf/graphics-multimedia/, Mar. 30, 2017.

Constable, Declarative Graphics Server Design Document, pp. 1-7, Aug. 23, 2018.

Render pipelines, Unity User Manual, 2 pages, available at https://docs.unity3d.com/Manual/render-pipelines.html, 2019.

International Search Report and Written Opinion for International Application No. PCT/US2020/049288, dated Dec. 9, 2020.

\* cited by examiner

RENDERING IMAGES USING DECLARATIVE GRAPHICS SERVER

TECHNICAL FIELD

This disclosure generally relates to an operating systems of computing devices.

BACKGROUND

Conventional operating systems designed to display two-dimensional (2D) objects within a 2D space typically include applications that each create a respective 2D frame buffer of an object. System software, e.g. such as a windows manager, can then place the 2D frame buffers created by each application into a cohesive 2D display for a user. This approach may be sufficient for 2D displays in that the 2D frame buffers created by applications are typically not required to change in response to changes in a user's orientation or perspective. However, for operating systems designed to display three-dimensional (3D) objects within a 3D space, e.g., such as an artificial reality environment, objects within the space may require an updated appearance or perspective as the user interacts with the 3D environment. A typical solution may be to require each application to reiteratively create a new object, e.g. new frame buffers for the object, that accommodates each update which the operating system may then place into an updated 3D environment. However, such a solution is impractical in terms of power consumption since it would require applications to run continually to provide updated content and further require the new frame buffers to be stored and read from memory. To reduce the number of new frame buffers created, such a solution may allow applications to share a single set of graphics processing unit frame buffers. However, this introduces an inherent security risk as each application may have access to the output of other applications. Furthermore, an operating system in which applications independently communicate with a graphics processing unit may starve one another or seize the graphics processing unit while running. This can cause latency within the 3D environment.

SUMMARY OF PARTICULAR EMBODIMENTS

In particular embodiments, an operating system may employ a declarative graphics server to service clients with respect to graphics rendering. The clients may be applications running in the operating system that each describe an object, or objects, to be rendered by the declarative graphics server. Each application may instantiate a declarative graphics server library, which it can use to build a data structure comprised of declarative definitions of objects (e.g., 2D objects, 3D objects, strings, and the like) describing how the objects should appear to a user as the user interacts with the objects in an artificial reality environment. Each application can asynchronously transmit its data structure (e.g., a scene graph) to the declarative graphics server via an inter-process communication channel, which may include additional assets such as images, video objects, and/or meshes, for example.

In particular embodiments, the declarative graphics server may then build a render graph in the form of an n-ary tree comprised of the data structures received from each application. Each node in the render graph may include a declarative definition of an object. The declarative graphics server may process the render graph by traversing each node, instructing a graphics processing unit to render the object defined by the node, and describing how the object is to change in appearance as the user changes pose or otherwise interacts with the object. Once the render graph has been processed, a composite of the objects described by each application may be displayed for the user in the artificial reality environment. Furthermore, the objects may change in appearance based on the user's pose without requiring additional data structures from the applications. This provides minimal power consumption in that each application can provide the declarative graphics server with a data structure describing an object, and the declarative graphics server can therefore instruct the graphics processing unit to render the object on behalf of the application. Thus, an application can be put into a low-power mode (e.g., sleep mode) until certain events may occur.

Innovative aspects of the subject matter described in this specification may be embodied in a system, a method, and computer-readable non-transitory storage media for receiving, by an operating system, a plurality of data structures from a plurality of applications executing on the operating system, wherein each of the plurality of data structures includes a declarative definition of one or more objects within a volumetric space to be displayed to a user of the operating system; generating, by the operating system, a render graph comprising the declarative definition of each of the plurality of data structures; and causing, by the operating system, one or more images of the one or more objects associated with each of the plurality of data structures to be rendered based on the render graph and a pose of the user relative to the volumetric space.

In one or more of the disclosed embodiments, the system, method, and computer-readable non-transitory storage media further comprise determining, by the operating system, a second pose of the user while at least one of the plurality of applications is in a sleep mode; and causing, by the operating system, one or more second images of the one or more objects associated with each of the plurality of data structures to be rendered based on the render graph and the second pose of the user relative to the volumetric space.

In one or more of the disclosed embodiments, the plurality of data structures is received from the plurality of applications via a plurality of inter-process communication (IPC) channels.

In one or more of the disclosed embodiments, the operating system includes: a microkernel; and a declarative graphics server configured to generate the render graph comprising the declarative definition of each of the plurality of data structures.

In one or more of the disclosed embodiments, the render graph comprises one or more nodes, wherein at least one of the one or more nodes comprises a reference to an asset associated with the one or more objects.

In one or more of the disclosed embodiments, the render graph comprises one or more nodes, wherein at least one of the one or more nodes comprises: a list of child nodes; one or more command lists; and a transform associated with the one or more objects.

In one or more of the disclosed embodiments, the pose of the user is comprised of head-tracking information generated by one or more sensors worn by the user.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

DESCRIPTION OF EXAMPLE EMBODIMENTS

Figure 1A:
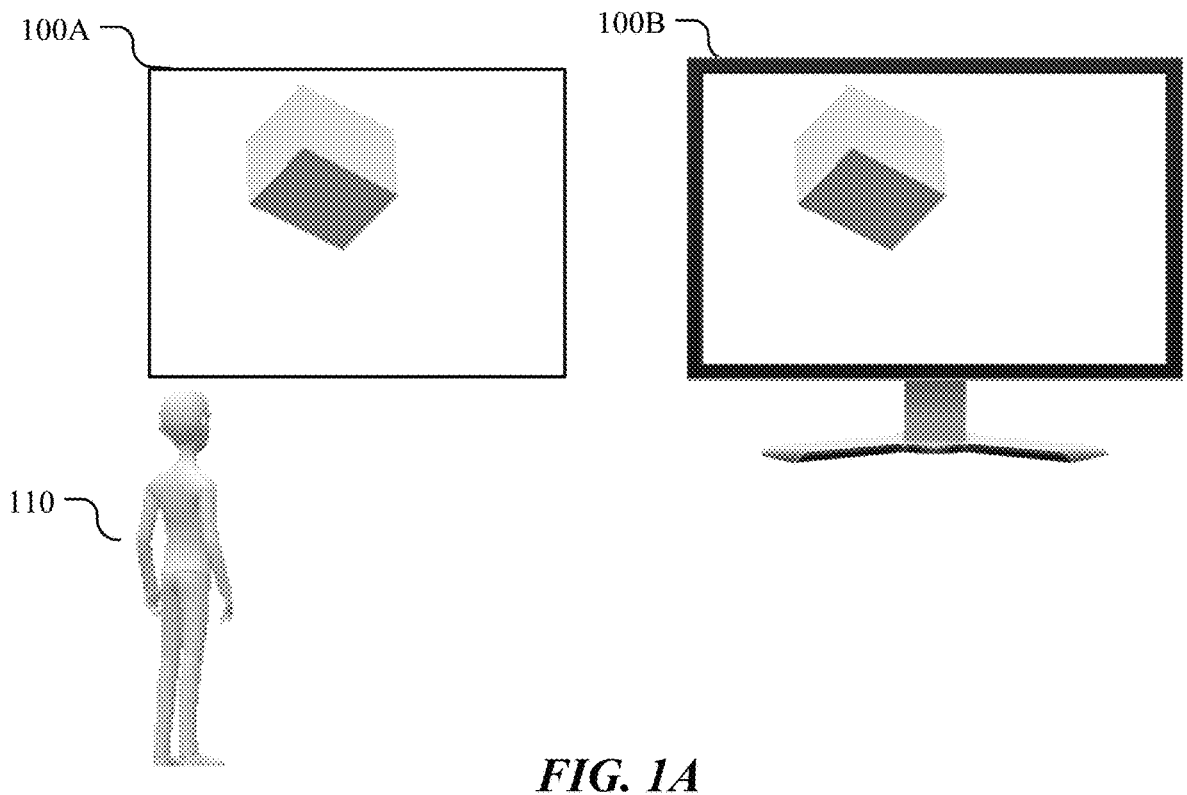
FIGS. 1A & 1B illustrate example use cases of user interaction with a three-dimensional (3D) rendering for a two-dimensional (2D) display.
Figure 1B:
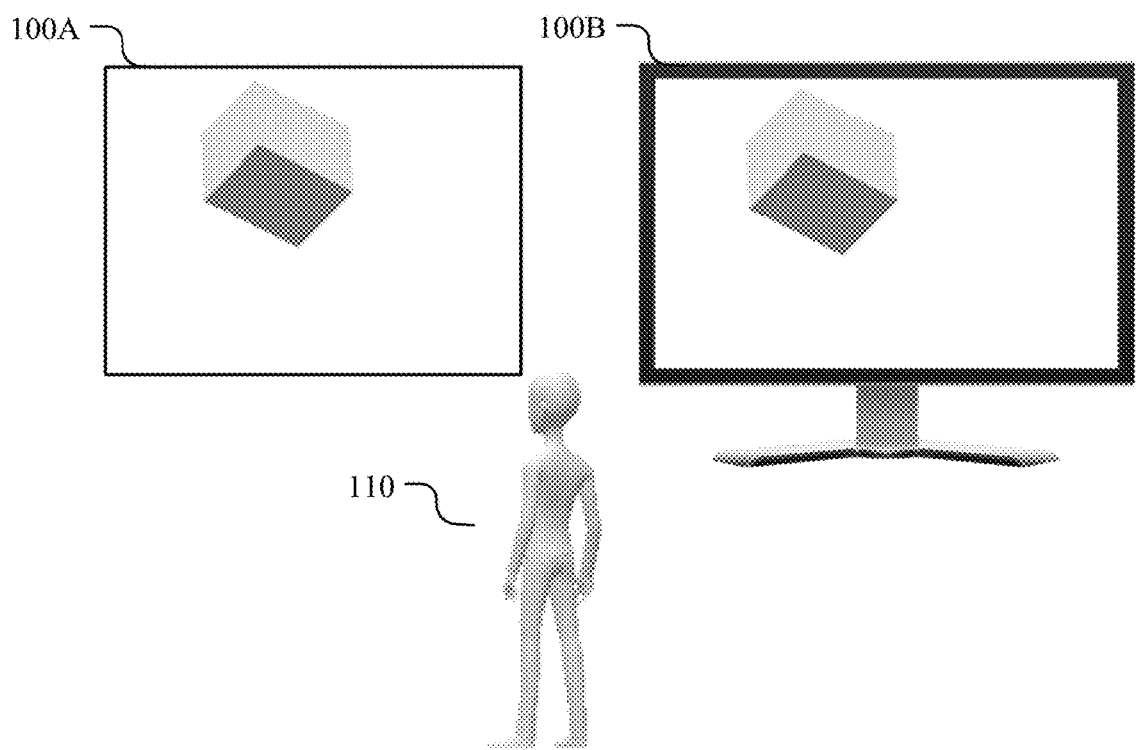

FIGS. 1A & 1B illustrate example use cases of user interaction with a three-dimensional (3D) rendering for a two-dimensional (2D) display. In the example illustrated in FIG. 1A, a user 110 of an operating system is viewing a 3D rendering of object 100A from a left position in relation to object 100A. The image rendered and displayed on 2D screen 100B (e.g., such as the screen of an HMD) is displayed to user 110 in a particular orientation. In FIG. 1B, the user 110 has changed pose, and is viewing the 3D rendering of object 100A from a right position in relation to object 100A. However, the image rendered and displayed on 2D screen 100B is displayed in the same position as it was previously displayed from the left position shown in FIG. 1A. That is, object 100A displayed on 2D screen 100B does not change orientation given the user's 110 change in pose. This may be typical of conventional operating systems designed to display two-dimensional (2D) objects within a 2D space that employ applications that each create a respective 2D frame buffer of an object. In addition, such operating systems may employ system software, e.g. such as a windows manager, that can then place the 2D frame buffers created by each application into a cohesive 2D display for a user. This approach may be sufficient for 2D displays in that the 2D frame buffers created by applications are typically not required to change in response to changes in a user's orientation or perspective.

Figure 1C:
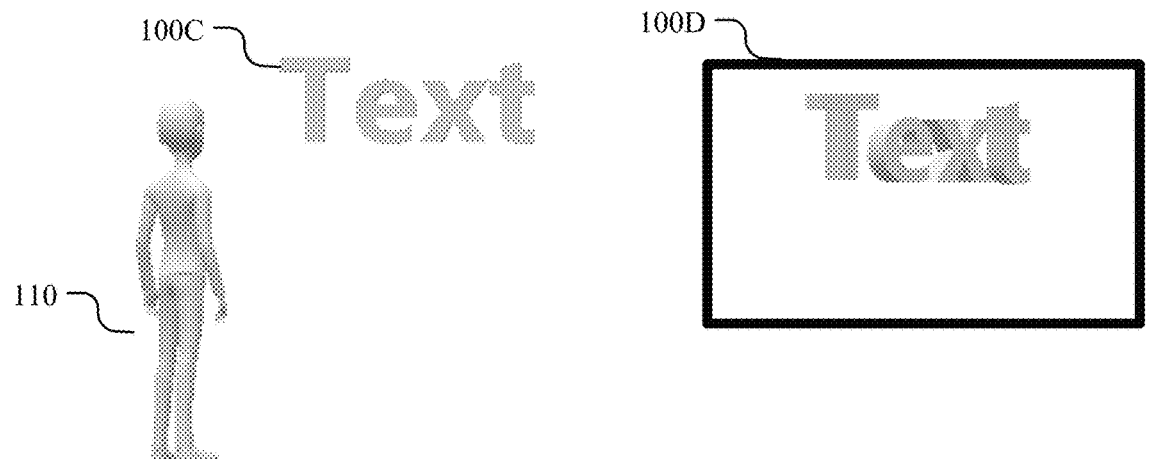
FIGS. 1C & 1D illustrate example use cases of user interaction with a three-dimensional (3D) rendering within a 3D space.
Figure 1D:
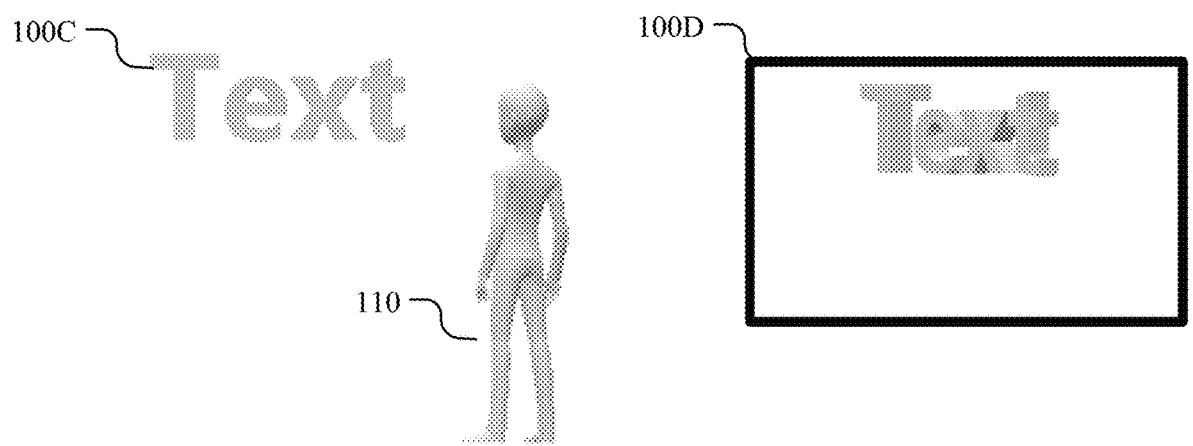

FIGS. 1C & 1D illustrate example use cases of user interaction with a three-dimensional (3D) rendering within a 3D space. In the example illustrated in FIG. 1C, a user 110 of an operating system is viewing a 3D object 100C from a left position in relation to object 100C. The 3D image 100D rendered and displayed for user 110 accounts for the perspective of user 110. That is, the 3D object 100C is displayed such that it appears as user 110 may view 3D object 100C in a 3D environment. In FIG. 1D user 110 has changed pose and is viewing 3D object 100C from a right position in relation to 3D object 100C. Here, the 3D image 100D rendered and displayed for user 110 again accounts for the perspective of user 110 in the 3D environment. Typically, operating systems designed to display three-dimensional (3D) objects within a 3D space, e.g., such as an artificial reality environment, may require an updated appearance or perspective as the user interacts with the 3D environment. One solution may be to require each application to reiteratively create a new object that accommodates each update which the operating system may then place into an updated 3D environment. However, such a solution is impractical in terms of power consumption since it would require applications to run continually to provide updated content and further require the new frame buffers to be stored and read from memory. Additionally, applications independently communicating with a graphics processing unit may starve one another or seize the graphics processing unit while running. This can cause latency within the 3D environment. Furthermore, such a solution may allow applications to write their frame buffers to the same buffer to reduce memory access and/or data transfer between processes which introduces an inherent security risk as each application may have access to another application's content.

Figure 2:
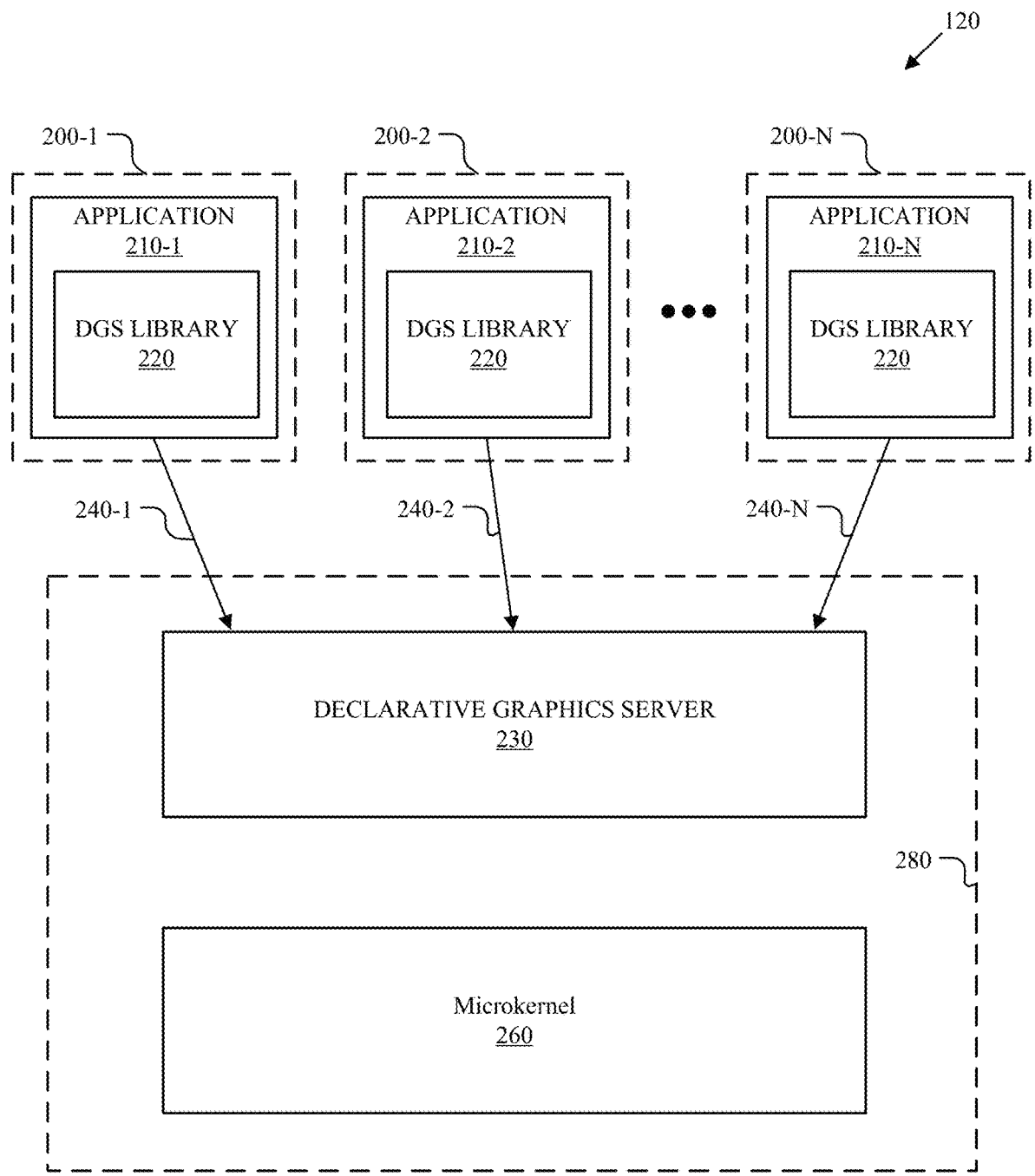
FIG. 2 illustrates an example system environment in which a declarative graphics server operates.

FIG. 2 illustrates an example system environment in which a declarative graphics server operates. In the example illustrated in FIG. 2, system environment 120 includes applications 210-1 through 210-N (collectively referred to herein as "applications 210"), declarative graphics server (DGS) 230, and microkernel 260. Each application 210 includes a DGS library 220. Applications 210 execute in processes 200-1 through 200-N (collectively referred to herein as "processes 200") such that each application executes within its own process 200. DGS 230 and microkernel 260 operate within operating system (OS) 280. In other embodiments, system environment 120 may include additional, fewer, or any combination of components suitable for managing an operating system.

OS 280 is system software that manages hardware and software resources and provides common services for applications 210 of system environment 120. OS 280 supports a system in which images may be rendered for artificial reality (e.g., VR, AR, MR, and the like) in real-time within a 3D, or "volumetric," space while maintaining minimal power consumption by the overall system. In the embodiment illustrated in FIG. 2, OS 280 employs a microkernel 260 comprised of the minimum software required to implement OS 280. In the embodiment illustrated in FIG. 2, OS 280 includes microkernel 260 for performing low-level address space management, thread management, and inter-process communication (IPC) in kernel space. Other functions of OS 280 (e.g., device drivers, file systems, I/O devices, and the like) can be managed in user space. Microkernel 260 architecture affords OS 280 increased modularity in which individual components can be replaced, reloaded, and/or modified, if required. Additionally, the modular structure of OS 280 can increase system security within OS 280 and decrease power consumption of the overall system as components are only used when needed. Furthermore, the modular structure may prevent system crashes as failure of any components running in user space (e.g., applications 210) may not necessarily crash OS 280. While at times this disclosure refers to various systems and methods implemented in the context of a microkernel operating system, it should be understood that systems and methods described are applicable to an operating system with a different kernel configuration. In one embodiment, OS 280 may employ a monolithic kernel architecture in which the entire OS 280 operates in kernel space. In another embodiment, OS 280 may employ a hybrid kernel comprised of elements of both microkernel and monolithic kernel design.

Applications 210 are clients running in OS 280 that describe objects (e.g., artificial reality objects) to be rendered for a user in a volumetric space. Applications 210 may include data structures (e.g., arrays, lists, n-ary trees, and the like) comprised of declarative models describing objects such as 2D objects, 3D objects, and strings, for example. For example, one application may describe a 3D model of a kiosk to be rendered for a user such that the user may interact with the kiosk within a volumetric space. Applications 210 are non-exclusive in that their renderings will coexist with output from other applications and will have their renderings managed by an OS 280 process. In one embodiment, such as that within a microkernel 260 architecture, applications 210 running in OS 280 may execute in user space as background processes (e.g., daemons or microkernel server) isolated from user interaction. In another embodiment, applications 210 may receive user interaction such as via a user interface displayed to a user and can modify the objects described in their data structures based on the interaction.

In one embodiment, applications 210 in system environment 120 may be provided by different publishers, where each application 210 provides the user with a different functionality. For example, a directions application may provide a user with directions (e.g., through a city or business establishment) by displaying a virtual path designated by lines in which the user is to follow. The virtual path may be presented to the user as an AR overlay of what the user is currently viewing through a display device (e.g., such as an LCD screen of a standalone HMD). In another example, a scheduling application may provide a user with a schedule for public transportation in response to the user being in proximity to, or looking at, a bus stop or train station for a threshold period of time. The scheduling information may be displayed to the user within a lower portion of a display device such that it does not to obstruct the view of the user. Other examples of applications 210 can include messaging applications, weather applications, review applications for businesses or services, health-related applications displaying a user's biometrics, etc. In one embodiment, each application 210 may be sourced from various publishers. In another embodiment, each application 210 in system environment 120 may be sourced from a single proprietary publisher. In yet another embodiment, applications 210 in system environment 120 may be sourced from multiple, single, or any combination of publishers described above.

In one embodiment, data structures contained in applications 210 may describe various assets such as photos or videos to be displayed to a user. For example, an application 210 may describe a video object to be included in a composite rendering of 2D and 3D objects from each application 210. The application 210 may serialize, or otherwise encode, the video object into a stream such that DGS 230 may receive the stream (e.g., via IPC channel 240) and deserialize, or otherwise decode, the video object for presentation to the user. In one embodiment, application 210 may additionally send commands to DGS associated with the video (e.g., start, stop, seek, and the like). For example, a user may generate commands via a user interface associated with the application that may be displayed to the user with the video object. DGS may receive the commands from application 210 and accordingly communicate with GPU to queue frames of video object for display. In this way, applications 210 can describe various media assets for display in addition to 2D and 3D objects.

Each application 210 includes its own process 200. Each process 200 is an instance of an application 210 that is being executed by one or many threads. It contains the program code for an application 210 and its activity. Each process 200 may be made up of multiple threads of execution that execute instructions concurrently. While an application 210 is a passive collection of instructions, process 200 is the actual execution of those instructions. Each process 200 executing in system environment 120 is isolated from other processes 200. For example, process 200-1 and process 200-2 as shown in FIG. 2 may execute concurrently in OS 280 but remain isolated from one another such that they do not share program code, or other such application 210 resources, while executing.

In one embodiment, each application 210 includes a DGS library 220 that it may use to build a declarative definition of 2D and 3D objects to be displayed to a user in a volumetric space (e.g., in artificial realty). Declarative definitions may represent 2D and 3D models of objects using a declarative programming paradigm (e.g., HTML, XML, CSS, and the like) that expresses the logic of a computation without describing its control flow to DGS 230. That is, applications may use DGS library 220 to declaratively describe how an object is to appear to a user rather than drawing the object for the user through functions, methods, or other resources of an imperative programming paradigm (e.g., using C++ or JavaScript). Applications 210 running in OS 280 use declarative graphics to minimize power consumption while maintaining reliable rendering characteristics. In one embodiment, DGS library 220 may comprise a collection of non-volatile resources, such as configuration data, subroutines, classes, values, type specifications, and the like, that applications 210 may use to map their data structures into a data structure format or schema expected by DGS 230 such that they may be processed.

An IPC channel 240 is a bi-directional, buffered communication channel with two end points referenced using handles. Each application 210 can communicate with DGS 230 using its own respective IPC channel 240. In particular, each application 210 may transmit data structures (e.g., an n-ary tree data structure) that include declarative definitions of objects to DGS 230 using an IPC channel 240. Applications 210 may transmit data structures to DGS 230 asynchronously as they are needed for display, or in response to having data within the data structures modified (e.g., by a user). In one embodiment, IPC channels 240 allow the transfer of a byte-sized message and a set of handles. In other embodiments, IPC channels may allow larger, or smaller, message sizes for transfer.

In one embodiment, DGS 230 is a server used by OS 280 to render objects for a user. In particular, DGS 230 can receive data structures that describe 2D and 3D objects from each application 210 in system environment 120 (e.g., via IPC channels 240) and can generate a structure in memory, or "render graph," to represent a composite of the received data structures. DGS 230 may process the render graph and instruct a graphics processing unit (GPU) to render the 2D and 3D objects described in the render graph on behalf of applications 210. DGS 230 minimizes power consumption of the overall system environment 120 by communicating with the GPU directly (e.g., commanding the GPU to render objects) rather than requiring each application 210 to attempt to control the GPU. In addition, because the render graph is comprised of declarative definitions of how 2D and 3D objects should appear to a user from multiple perspectives in a volumetric environment, DGS 230 can generate and store the render graph once. That is, the render graph does not require additional data structures from applications 210 in response to a user changing pose (e.g., walking, crouching, panning/tilting head, and the like). Here, an application 210, or process 200, may be placed into a low-power mode, for example, if it has been inactive for a threshold period of time. This further minimizes power consumption of the overall system environment 120 in that applications 210 in the low-power mode do not consume cycles. Applications 210 may remain in low-power mode until certain events might occur. Applications 210 may exit low-power mode to resume transmitting data structures to DGS 230 in response to certain events. In one example, an application 210 may exit low-power mode, or "wake up," in response to a user coming in to field of view of a 3D object such that the application 210 may enhance the 3D object's appearance. In another example, an application 210, such as an email application, may wake up in response to receiving a message on a network, such as an email, to be displayed to a user. In one embodiment, an application 210 may wake up in response to receiving user input that modifies data within its data structure.

DGS 230 generates a render graph comprised of each data structure received from applications 210. In one embodiment, each data structure received is of an n-ary tree data structure format. In another embodiment, DGS 230 can build an n-ary tree data structure based on the data included in the data structure received from an application 210. For example, DGS 230 may extract the declarative definitions of one or more objects from a received data structure and build an n-ary tree data structure that includes the declarative definitions such that each of the one or more objects is represented by its own node. DGS 230 can assemble the render graph as a composite of n-ary tree data structures such that they form a hierarchy of objects to be rendered by a GPU.

Each n-ary tree data structure in render graph is comprised of nodes. For example, DGS 230 may designate one object described in a data structure received from an application 210 to be described by a root node, and designate various attributes describing the object to child nodes of the root node. For example, a root node may generally describe a 3D model of a house and each child node of the root node may describe an additional attribute of the house such as a door and a window. In one embodiment, each node includes a list of child nodes, a command list, and transformation data associated with the object described by the node. Each list of child nodes may include a pointer to a left child and a pointer to a right child stored in memory. DGS 230 may use the list of child nodes to access and render each left child node and right child node comprising the n-ary tree data structure until one or more objects described by the n-ary tree data structure have been rendered. Each command list may include instructions for drawing the objects described by the node. In one embodiment, DGS 230 may use various functions and methods included in a command list to instruct a GPU on how it is to draw an object (e.g., 2D object, 3D object, string, and the like). Command lists may be serialized by applications 210 into a data blob that can be transmitted to DGS 230 in a method call (e.g., using DGS library). DGS 230 may then deserialize the command list when processing each node in render graph. Transformation data included in each node indicates to the GPU how an object is to transform in appearance in response to a user's pose (e.g., translation and scaling data). For example, if a user moves closer to a 3D object in a volumetric space, transformation data may instruct the GPU to increase the scale of the 3D object to convey the illusion that the user is closer to the 3D object.

DGS 230 can process the render graph in a hierarchical order such that each root node is rendered before its child nodes. In one embodiment, DGS 230 may process the render graph using a depth-first traversal across the render graph. Each node may be processed such its declarative data may be used to render the object it describes. For example, DGS 230 may process a node having a command list that includes a "drawRect( )" function having parameters that define each corner of a rectangle to be drawn by a GPU. DGS 230 may call this function as the node is being processes and pass the parameters to the GPU such that it may render the rectangle for a user according to the parameters. Similarly, DGS 230 may call any other functions included in the command list for the node until the object has been rendered for the user. In addition, while processing a node, DGS 230 can instruct the GPU regarding how the object described by the node is to transform in response to a change in the user's pose using transformation data included in the node. Render graph processing is described in further detail in regard to FIG. 3.

In one embodiment, a GPU may render each object to be displayed to a user based on a render graph generated by DGS 230. The GPU can render objects (e.g., 2D, 3D, strings, and the like) using a parallel processing architecture. In one embodiment, a GPU can receive commands from DGS 230 (e.g., via command lists) instructing the GPU how to draw objects. For example, a GPU may receive a draw command from DGS 230 describing a polygon that includes a list of vertices. Each vertex in the list may represent a point in a volumetric space (e.g., including x, y, and z coordinates). The GPU may plot each vertex until an outline of the polygon is complete and rasterize the polygon by converting the outline into pixels that can be displayed for a user. In addition, the GPU may transform the polygon (e.g., such as moving, rotating, etc.) in relation to the user's pose. The GPU can perform transformations based on transformation data provided by DGS 230 for each node in the render graph.

Figure 3:
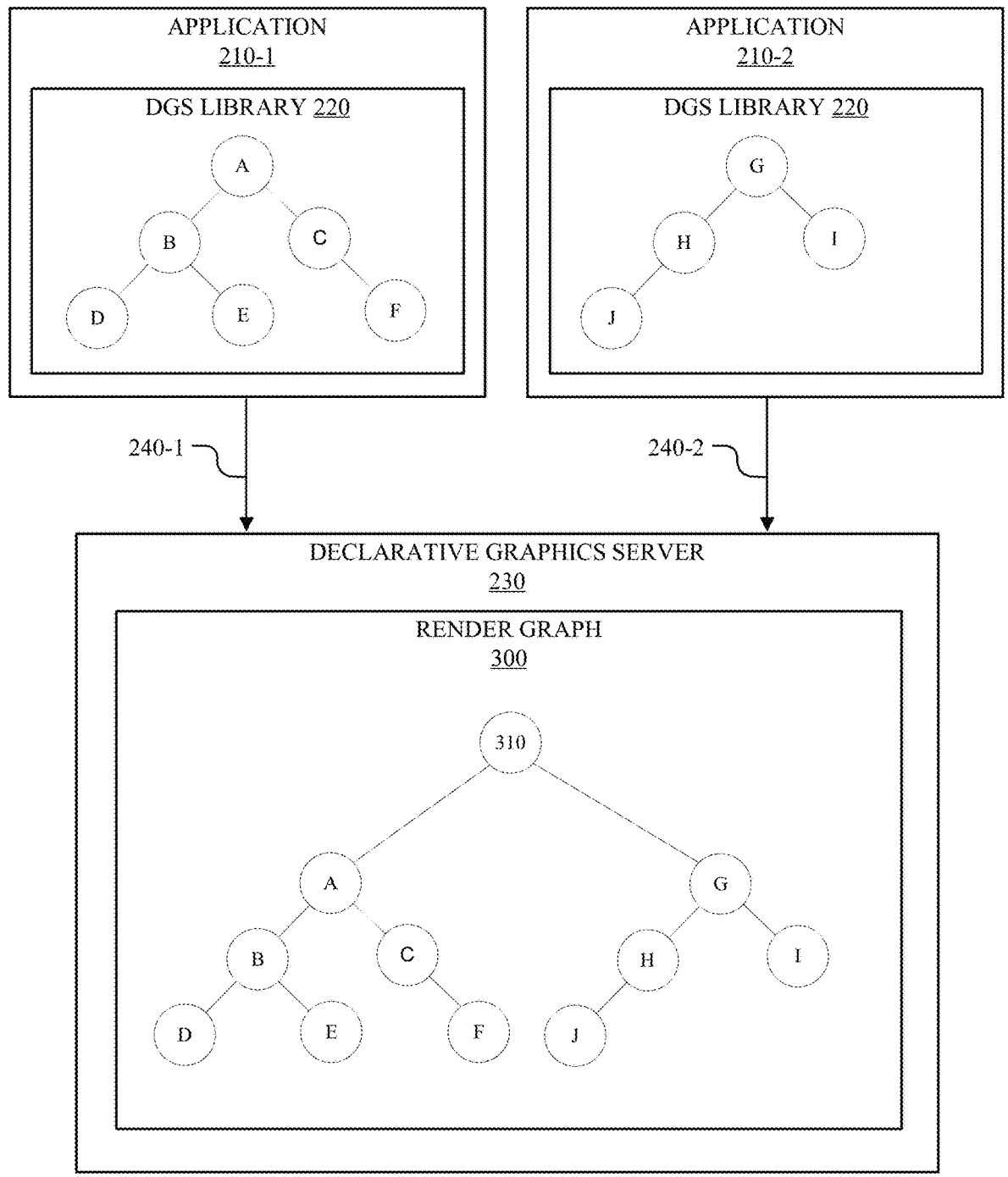
FIG. 3 illustrates an example process for generating a render graph.

FIG. 3 illustrates an example process for generating a render graph. In the example illustrated in FIG. 3, applications 210-1 and 210-2 both include n-ary tree data structures describing 2D objects, 3D objects, and strings to be rendered for a user within an augmented reality (AR) environment. Application 210-1 includes an n-ary tree data structure comprised of nodes A-F. Application 210-2 includes an n-ary tree data structure comprised of nodes G-J. DGS 230 includes render graph 300. In render graph 300, n-ary tree data structures received from applications 210-1 and 210-2 have been linked as children to root node 310 such that node A and node G are left child and right child of root node 310, respectively. In one embodiment, root node 310 may be provided by OS 280 to describe the volumetric space into which objects are to be rendered. For example, root node 310 may define an empty 3D space that provides a virtual area into which 2D objects, 3D objects, and strings may be drawn. In another embodiment, root node 310 may be generated by DGS 230 when render graph 300 is built.

In the example illustrated in FIG. 3, the n-ary tree data structure of application 210-1 may describe a 3D model of an information kiosk to be displayed to a user in a business establishment that includes a composition of 2D objects, 3D objects, and strings. Root node A may describe a general 3D frame of the kiosk, defining aspects of the kiosk including points within volumetric space that define its shape (e.g., as described in a command list), describing how the kiosk is to change in appearance in response to changes in a user's pose (e.g., as described by transformation data), and including a list of additional objects that may be included on the kiosk (e.g., as described by list of child nodes). Similarly, node B (i.e., left child of root node A) may describe a 2D user interface to be positioned at the front of the information kiosk such that a user may interact with the user interface to access information associated with the business establishment. Node B may also define a shape of the user interface, describe how the user interface is to change in appearance in response to changes in the user's pose, and include a list of additional objects that may be rendered on the user interface. Node D (i.e., left child of node B) may define a 3D map of the business establishment to be positioned over a portion of the 2D user interface described by node B. Here, node D may define a shape similar to the user interface and describe how the 3D map is to change in appearance responsive to the user's change in pose. However, node D does not point to any additional objects to include on the 3D map as indicated by its absence of child nodes. Similarly, node E may describe a 2D compass displaying cardinal directions to be positioned over the 2D user interface described by node B but does not define any additional objects to include on the 2D compass given its absence of child nodes. Additionally, node C may define a 2D surface to be positioned over an upper portion of the front of the information kiosk and node D may define a string that includes the text "Information Kiosk" to be positioned over the 2D surface described by node C. In the example shown in FIG. 3, application 210-1 can use DGS library 220 to transmit the n-ary tree data structure to DGS 230 via IPC channel 240-1.

In the example illustrated in FIG. 3, the n-ary tree data structure of application 210-2 may describe a 3D model of an inventory kiosk to be displayed to a user of the business establishment proximate to the information kiosk described above. Similar to the information kiosk, inventory kiosk may include a composition of 2D and 3D objects displayed for a user in volumetric space. Root node G may describe a general 3D frame of the kiosk in a similar manner to root node A. Node I (right child of root node G) may describe a 2D user interface to be positioned at the front of the inventory kiosk such that a user may interact with the user interface to access information associated with an inventory of items in the business establishment. Similar to node B, node I may also define a shape of the user interface (e.g., as described in a command list) and describe how the user interface is to change in appearance in response to changes in the user's pose (e.g., as described by transformation data). However, node I does not point to any additional objects to include on the 2D user interface as indicated by its absence of child nodes. Node H (left child of root node G) may define a 2D surface to be positioned over an upper portion of the front of the inventory kiosk and node J may define a string that includes the text "Inventory Kiosk" to be positioned over the 2D surface described by node H. In the example shown in FIG. 3, application 210-2 can use DGS library 220 to transmit the n-ary tree data structure to DGS 230 via IPC channel 240-2.

DGS 230 can receive the n-ary tree data structures from applications 210-1 and 210-2 and build render graph 300 comprised of both n-ary tree data structures and root node 310. As shown in FIG. 3, DGS 230 can position root node A as a left child of root node 310 when building render graph 300. Similarly, DGS 230 can position root node G as a right child of root node 310. Once render graph 300 is built and stored in memory, DGS 230 can process each node in render graph 300 in a depth-first order. DGS 230 can begin by processing root node 310. In particular, DGS 230 can extract declarative data from root node 310 including its list of child nodes (e.g., node A and node G), its transformation data, and its command list. DGS 230 can use commands in the command list to instruct a GPU regarding how the 3D space described by root node 310 is to appear to a user. DGS 230 can use the transformation data included in root node 310 to instruct the GPU regarding how the 3D space described by root node 310 is to change in appearance as a user moves throughout the space. DGS 230 can use the child list included in root node 310 to identify a pointer to node A such that it can continue processing render graph 300. DGS 230 can use the pointer to node A to locate node A in memory and begin processing the declarative data included in the node. In particular, DGS 230 may use commands in the command list to instruct the GPU regarding how the information kiosk is to appear to a user. DGS 230 can use the transformation data included in node A to instruct the GPU regarding how the information kiosk is to change in appearance as a user changes pose. Additionally, DGS 230 can use the child list included in node A to identify pointers to node B and node C in memory. Next, DGS 230 may use the pointer to node B (included in node A) to begin processing node B similarly to root node 310 and node A as described above. DGS 230 may then continue to traverse render graph 300 by processing nodes D, E, C, F, G, H, J, and I until render graph 300 has been completely processed and the GPU has rendered a composite image of the information kiosk and the inventory kiosk within the 3D space.

Figure 4:
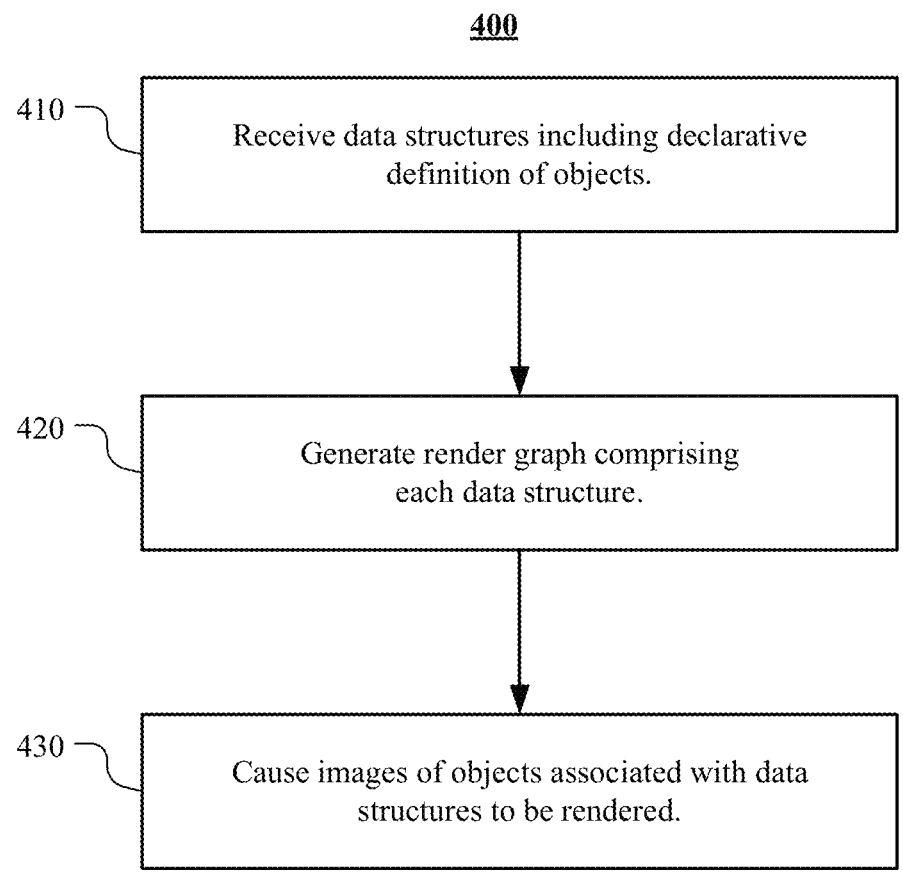
FIG. 4 illustrates an example method for causing objects to be rendered in a volumetric space.

FIG. 4 illustrates an example method 400 for causing objects to be rendered in a volumetric space. The method may begin at step 410, where the operating system receives multiple data structures from applications executing on the operating system. Each data structure includes a declarative definition of objects within a volumetric space to be displayed to a user of the operating system. At step 420, the operating system generates a render graph that includes the declarative definitions received in each data structure. At step 430, the operating system causes images of the objects associated with each data structure to be rendered. The objects are rendered based on the render graph and a pose of the user in relation to the volumetric space.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for causing objects to be rendered in a volumetric space including the particular steps of the method of FIG. 4, this disclosure contemplates any suitable method for causing objects to be rendered in a volumetric space including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
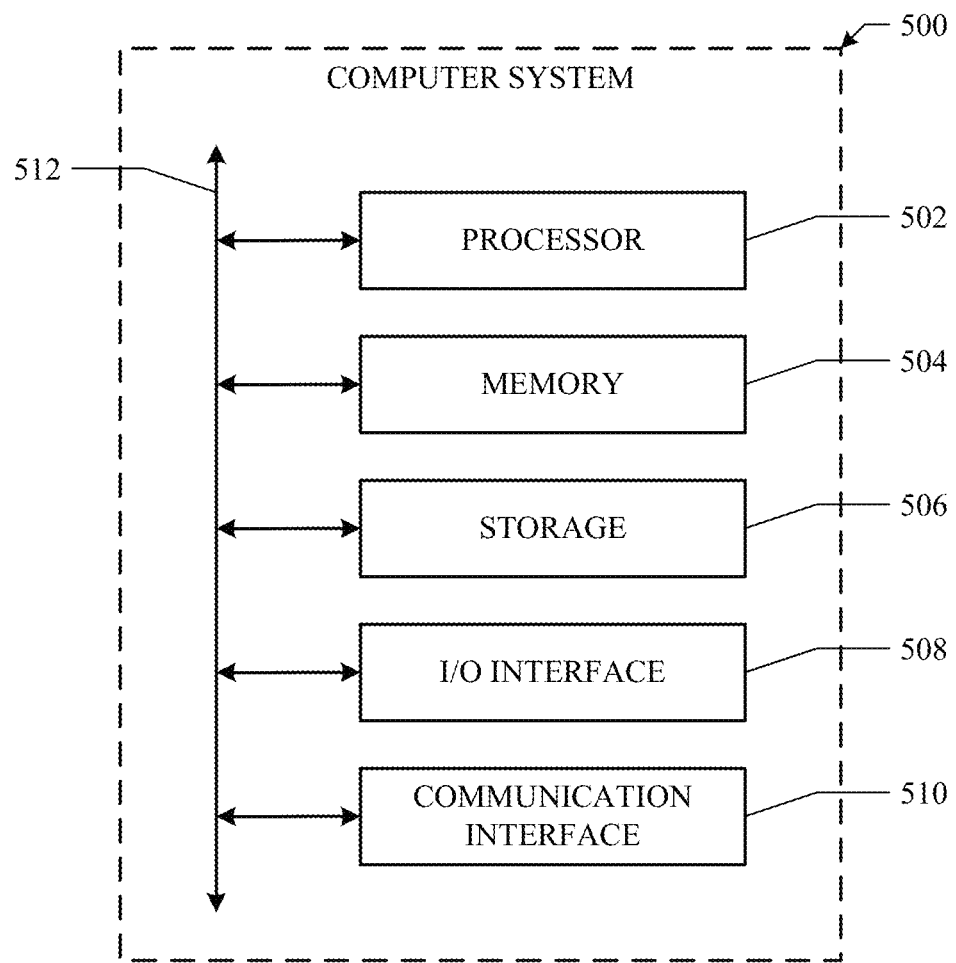
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, by an operating system, a plurality of data structures from a plurality of applications executing on the operating system, wherein each of the plurality of data structures includes a declarative definition of one or more objects within a volumetric space to be displayed to a user of the operating system;
   generating, by the operating system, a render graph comprising the declarative definition of each of the plurality of data structures;
   causing, by the operating system, one or more images of the one or more objects associated with each of the plurality of data structures to be rendered based on the render graph and a first pose of the user relative to the volumetric space;
   determining, by the operating system, a second pose of the user while at least one of the plurality of applications is in a low-power mode; and
   causing, by the operating system, one or more second images of the one or more objects associated with each of the plurality of data structures to be rendered based on the render graph and the second pose of the user relative to the volumetric space.

2. The method of claim 1, wherein the plurality of data structures is received from the plurality of applications via a plurality of inter-process communication (IPC) channels.

3. The method of claim 1, wherein the operating system includes:
   a microkernel; and
   a declarative graphics server configured to generate the render graph comprising the declarative definition of each of the plurality of data structures.

4. The method of claim 1, wherein the render graph comprises one or more nodes, wherein at least one of the one or more nodes comprises a reference to an asset associated with the one or more objects.

5. The method of claim 1, wherein the render graph comprises one or more nodes, wherein at least one of the one or more nodes comprises:
   a list of child nodes;
   one or more command lists; and
   a transform associated with the one or more objects.

6. The method of claim 1, wherein the first pose and second pose of the user are comprised of head-tracking information generated by one or more sensors worn by the user.

7. One or more computer-readable non-transitory storage media embodying software that is operable when executed to:
   receive, by an operating system, a plurality of data structures from a plurality of applications executing on the operating system, wherein each of the plurality of data structures includes a declarative definition of one or more objects within a volumetric space to be displayed to a user of the operating system;
   generate, by the operating system, a render graph comprising the declarative definition of each of the plurality of data structures;
   cause, by the operating system, one or more images of the one or more objects associated with each of the plurality of data structures to be rendered based on the render graph and a first pose of the user relative to the volumetric space;
   determine, by the operating system, a second pose of the user while at least one of the plurality of applications is in a low-power mode; and
   cause, by the operating system, one or more second images of the one or more objects associated with each of the plurality of data structures to be rendered based on the render graph and the second pose of the user relative to the volumetric space.

8. The media of claim 7, wherein the plurality of data structures is received from the plurality of applications via a plurality of inter-process communication (IPC) channels.

9. The media of claim 7, wherein the operating system includes:
   a microkernel; and
   a declarative graphics server configured to generate the render graph comprising the declarative definition of each of the plurality of data structures.

10. The media of claim 7, wherein the render graph comprises one or more nodes, wherein at least one of the one or more nodes comprises a reference to an asset associated with the one or more objects.

11. The media of claim 7, wherein the render graph comprises one or more nodes, wherein at least one of the one or more nodes comprises:
    a list of child nodes;
    one or more command lists; and
    a transform associated with the one or more objects.

12. The media of claim 7, wherein the first pose and second pose of the user are comprised of head-tracking information generated by one or more sensors worn by the user.

13. A system comprising:
    one or more processors; and
    one or more computer-readable non-transitory storage media coupled to one or more of the processors and comprising instructions operable when executed by one or more of the processors to cause the system to:
    receive, by an operating system, a plurality of data structures from a plurality of applications executing on the operating system, wherein each of the plurality of data structures includes a declarative definition of one or more objects within a volumetric space to be displayed to a user of the operating system;

generate, by the operating system, a render graph comprising the declarative definition of each of the plurality of data structures;

cause, by the operating system, one or more images of the one or more objects associated with each of the plurality of data structures to be rendered based on the render graph and a first pose of the user relative to the volumetric space;

determine, by the operating system, a second pose of the user while at least one of the plurality of applications is in a low-power mode; and cause, by the operating system, one or more second images of the one or more objects associated with each of the plurality of data structures to be rendered based on the render graph and the second pose of the user relative to the volumetric space.

14. The system of claim 13, wherein the plurality of data structures is received from the plurality of applications via a plurality of inter-process communication (IPC) channels.

15. The system of claim 13, wherein the operating system includes:
   a microkernel; and
   a declarative graphics server configured to generate the render graph comprising the declarative definition of each of the plurality of data structures.

16. The system of claim 13, wherein the render graph comprises one or more nodes, wherein at least one of the one or more nodes comprises a reference to an asset associated with the one or more objects.

17. The system of claim 13, wherein the render graph comprises one or more nodes, wherein at least one of the one or more nodes comprises:
   a list of child nodes;
   one or more command lists; and
   a transform associated with the one or more objects.

* * * * *